US007298528B2

(12) United States Patent
Nagashima

(10) Patent No.: US 7,298,528 B2
(45) Date of Patent: Nov. 20, 2007

(54) NETWORK POINT PRINTED MATTER AND PRINTING METHOD

(75) Inventor: Hisato Nagashima, Tokyo-To (JP)

(73) Assignee: National Printing Bureau, Incorporated Administrative Agency, Tokyo (JP)

( * ) Notice: Subject to any disclaimer, the term of this patent is extended or adjusted under 35 U.S.C. 154(b) by 749 days.

(21) Appl. No.: 10/494,203

(22) PCT Filed: Oct. 30, 2002

(86) PCT No.: PCT/JP02/11258

§ 371 (c)(1), (2), (4) Date: Apr. 29, 2004

(87) PCT Pub. No.: WO03/037643

PCT Pub. Date: May 8, 2003

(65) Prior Publication Data

US 2004/0255808 A1 Dec. 23, 2004

(30) Foreign Application Priority Data

Oct. 30, 2001 (JP) ............................ 2001-331891

(51) Int. Cl.
*H04N 1/405* (2006.01)

(52) U.S. Cl. .................................... 358/3.28; 358/3.06

(58) Field of Classification Search ................. 358/1.9, 358/2.1, 3.28, 3.06, 3.09–3.1, 3.13–3.14, 358/3.26
See application file for complete search history.

(56) References Cited

U.S. PATENT DOCUMENTS

| | | | | |
|---|---|---|---|---|
| 5,259,907 | A * | 11/1993 | Soules et al. | 156/277 |
| 6,036,232 | A | 3/2000 | Kaule et al. | |
| 6,441,921 | B1 * | 8/2002 | Soscia | 358/1.9 |

FOREIGN PATENT DOCUMENTS

| | | | |
|---|---|---|---|
| JP | 01-128877 | A | 5/1989 |
| JP | 2001-205917 | A | 7/2001 |
| JP | 3478474 | B2 | 12/2003 |
| WO | WO 95/13597 | | 5/1995 |

* cited by examiner

*Primary Examiner*—David Moore
*Assistant Examiner*—Stephen Brinich
(74) *Attorney, Agent, or Firm*—The Webb Law Firm

(57) ABSTRACT

A halftone dot printed product which imparts an anti-forgery function to a continuous-tone image by using four colors of Cyan, Magenta, Yellow, and Black, and a method of printing the same are disclosed.

The product and method include a first halftone region having m×m pixels and a second halftone region having n×n pixels, where halftone dots to express a continuous-tone image are printed, are laid out. A plurality of first halftone regions in independent regions are disposed tightly around one second halftone region. A plurality of second halftone regions are laid out along the outer periphery of one first halftone region at an equal interval. An embedded image is formed by at least one color ink containing no infrared absorptive dye and is laid out by using halftone dots in the first halftone region 1. An embedded image is formed by black ink containing an infrared absorptive dye and is laid out by halftone dots 3 in the second halftone region.

18 Claims, 7 Drawing Sheets

NETWORK POINT PRINTED MATTER AND PRINTING METHOD

BACKGROUND OF THE INVENTION

The present invention relates to printed products and a method for printing the same, such as banknotes, passports, stocks/bonds, cards, and valuable printed products, which require anti-forgery and anti-alteration functions.

BRIEF DESCRIPTION OF THE RELATED ART

Along with the recent increase in image quality of color copying machines and the progress in computerization of color plate making techniques, the forgery means for banknotes or stocks/bonds tends to become rich in variety. Especially, since image input/output devices used in the printing industry are obtaining much higher resolutions, it is becoming easy to extract thin lines or microcharacters used in stocks/bonds. This makes it possible to not only forge printed products by a general commercial printing method using simple four color halftone dots but also accurately extract, by using input/output devices such as scanners, designs using two values of white and black such as ground tints, lathe works, or relief patterns employed for many of current stocks/bonds. Hence, counterfeits are made more realistic by using various special color plates.

Japanese Patent Laid-Open No. 2001-205917 filed by the present applicant discloses an image masking method, in which visible and invisible images are generated by uniformly laying out two kinds of halftone dot images on the same plane, aiming at imparting an anti-forgery measure to continuous-tone images. According to this method, a latent image printed by using a functional ink can visually be recognized under predetermined visual recognition conditions corresponding to the optical characteristic of the ink regardless of its type.

However, such an anti-forgery measure requires expensive functional materials, and therefore, can be applied to only economically viable products from the viewpoint of production cost.

Using this phenomenon, a halftone dot printed product according to the present invention is characterized in that a plurality of sets of a first region and a second region adjacent to the first region are laid out, the second region has a 2ath region formed by using ink of a predetermined color containing an infrared absorptive dye and a 2bth region formed by using ink which is based on a color similar to the predetermined color and contains no infrared absorptive dye, and in accordance with a ratio of the 2ath region to the 2bth region in each second region, a halftone image is formed by the 2ath regions in the plurality of second regions.

The ink used in the 2ath region may be black ink, and the ink used in the 2bth region may be a black-color-based ink containing three primary color inks of cyan, magenta, and yellow.

An area of the first region may be set larger than that of the second region.

In the second region, the 2ath region may be surrounded by the 2bth region.

Ink containing no infrared absorptive dye may be used in the first region.

Halftone dots can be laid out in each first region by using ink containing no infrared absorptive dye, and a halftone image can be formed by a plurality of first regions.

Each second region may be surrounded by the plurality of first regions.

The halftone dot printed product can further comprise an image region formed by using ink containing no infrared absorptive dye.

The image region formed by using the ink containing no infrared absorptive dye and the first region and second region may be printed while being at least partially superposed.

A halftone dot printed product printing method according to the present invention is characterized in that a plurality of sets of a first region and a second region adjacent to the first region are laid out, the second region has a 2ath region formed by using ink of a predetermined color containing an infrared absorptive dye and a 2bth region formed by using ink which is based on a color similar to the predetermined color and contains no infrared absorptive dye, and in accordance with a ratio of the 2ath region to the 2bth region in each second region, a halftone image is formed by the 2ath regions in the plurality of second regions.

Black ink can be used in the 2ath region, and a black-color-based ink containing three primary color inks of cyan, magenta, and yellow can be used in the 2bth region.

An area of the first region may be set larger than that of the second region.

In the second region, the 2ath region can be surrounded by the 2bth region.

Ink containing no infrared absorptive dye may be used in the first region.

Halftone dots can be laid out in each first region by using ink containing no infrared absorptive dye, and a halftone image can be formed by a plurality of first regions.

Each second region can be surrounded by the plurality of first regions.

The method may further comprise an image region formed by using ink containing no infrared absorptive dye.

The image region formed by using the ink containing no infrared absorptive dye and the first region and second region can be printed while being at least partially superposed.

LISTING OF REFERENCE CHARACTERS

Figure 1A:
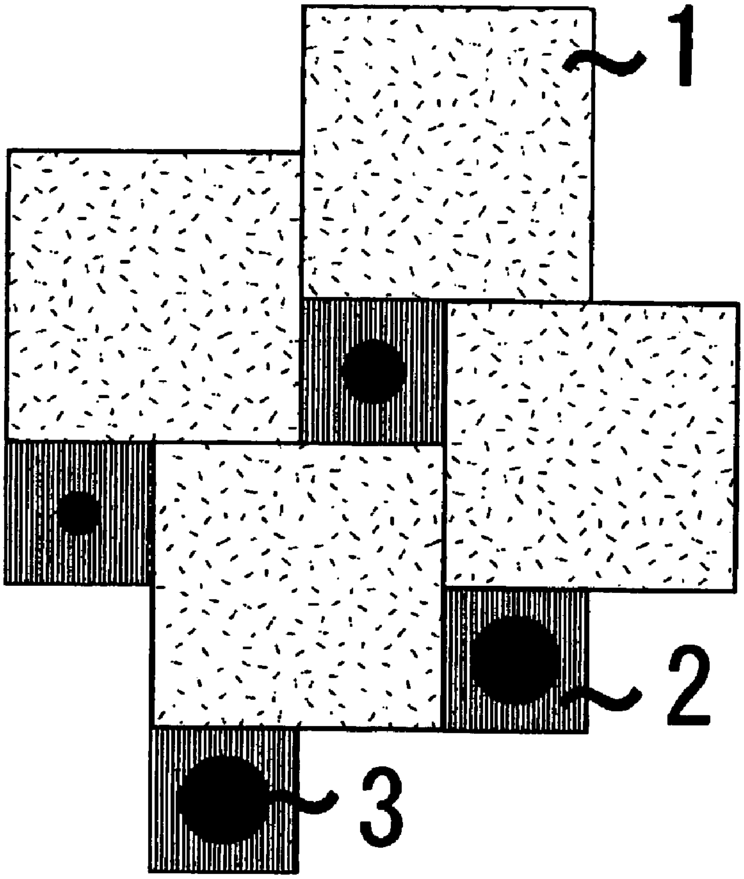
FIGS. 1A, 1B, and 1C are views for explaining a first halftone region having m×m pixels and a second halftone region having n×n pixels.

1 A first halftone region having m×m pixels, which is formed by at least one color ink containing no infrared absorptive dye and in which an embedded image which can visually be recognized is laid out by using halftone dots or no image is laid out by using halftone dots.

2 A portion in a second halftone region having n×n pixels, which is formed by three color solid images containing no infrared absorptive dye, which are prepared by three primary colors cyan (C), magenta (M), and yellow (Y).

3 A portion in the second halftone region having n×n pixels, in which an embedded image such as a character or an image formed by black (Bk) ink containing an infrared absorptive dye is laid out by using halftone dots.

a A general halftone dot image which does not use the halftone dot structure according to the present invention.

b A special halftone dot image which uses the halftone dot structure according to the present invention.

c A portion where the face image and name of an individual, which are laid out by a special halftone dot image using the halftone dots according to the present invention by the method of claim 1, are variable-printed by an on-demand printer. The portion explains an appearance change from a visible image to an invisible image.

d A portion where a general halftone dot image which does not use the halftone dot structure according to the present invention is laid out. The portion explains that the appearance does not change in the face image portion.

e A portion where the face image and name of an individual, which are laid out by a special halftone dot image using the halftone dots according to the present invention by the method of claim 2, are variable-printed by an on-demand printer. The portion explains an appearance change from a visible image to an invisible image.

d1 A partial enlarged view of the halftone dots of a landscape image of a mountain, which is halftone-processed by a method based on the postscript halftone dot generation method.

d1' A partial enlarged view of the halftone dots of a landscape image of a mountain, which is generated by using dl and an image mask m. The halftone dots are used as halftone dots for a visible image.

d2 A partial enlarged view of the halftone dots of a landscape image of a river, which is halftone-processed by a method based on the postscript halftone dot generation method.

d2' A partial enlarged view of the halftone dots of a landscape image of a river, which is generated by using d2 and the image mask m. The halftone dots are used as halftone dots for an invisible image.

d3 A partial enlarged view of halftone dots around the landscape image of the river, which is generated by using d2' and the image mask m. The halftone dots are used to hide the halftone dots for the invisible image.

d4 A partial enlarged view of halftone dots of an invisible image of an identification card. The halftone dots are printed by black (Bk) ink containing an infrared absorptive dye.

d5 A partial enlarged view of a portion around the halftone dots of the invisible image of the identification card. The portion is printed by a black-color-based three solid images formed by three primary colors of cyan (C), magenta (M), and yellow (Y).

P1 A landscape image of a mountain, which is used as a visible image.

P2 A landscape image of a river, which is used as an invisible image.

P3 An enlarged view of a printed product in which visible and invisible images are uniformly laid out on the same plane.

P4 An identification card in which visible and invisible images are uniformly laid out on the same plane.

P5 A face image of an identification card, which is used as an invisible image.

P6-1-P6-4 An identification card variable-printed by an on-demand printer by using the method of the first embodiment.

P7-1-P7-4 An identification card variable-printed by an on-demand printer by using the method of the second embodiment.

DESCRIPTION OF PREFERRED EMBODIMENTS OF THE PRESENT INVENTION

In the printing industry, halftone dots are always necessary for expressing a halftone dot image, i.e., a continuous-tone image in addition to two values of white and black on a printing paper sheet. This depends on the human visual nature that recognizes an aggregate of small dots as one tone in identifying a grayscale. Since techniques for converting a continuous-tone image into a halftone dot image have been led by major platemakers, users cannot freely create halftone dots by themselves. In the recent plate making industry, however, a postscript (registered trademark) language as one of computer page description languages has been developed, and commercially available application software based on the postscript language is becoming popular. For these reasons, color printed products that integrate characters and images can relatively easily be created. In addition, as the postscript language is widely used, users can launch creating halftone dots.

However, the technique for directly defining two kinds of halftone dot data in the postscript halftone dot generation method does not suffice for achieving the desired purpose.

The present inventor has proposed, in Japanese Patent Laid-Open No. 2001-205917, an image processing method of uniformly laying out two kinds of halftone dot images on the same plane by applying the above-described technique.

More specifically, a halftone dot printed product of the present invention provides a printed product which uses an infrared reflection (transmission) characteristic between a portion printed by cyan (C), magenta (M), and yellow (Y) inks used in known color inks and a portion printed by black (Bk) ink generally used and in which an invisible image is printed by the black (Bk) ink so that the image cannot be recognized unless a special authentication apparatus such as an infrared camera is used.

Embodiments

The embodiments of the present invention will be described below with reference to the accompanying drawings. The present invention is not limited to the following embodiments, and various changes and modifications can appropriately be made without departing from the spirit and scope of the appended claims.

First Embodiment

An example will be described as the first embodiment in which an image is printed in a predetermined region including a first halftone region having m×m pixels and a second halftone region having n×n pixels such that the image can be seen as a full-color image under ordinary light, and the other continuous-tone image can visually be recognized under a predetermined visual recognition condition different from the visual recognition condition and, for example, by using an infrared camera.

Figure 1B:
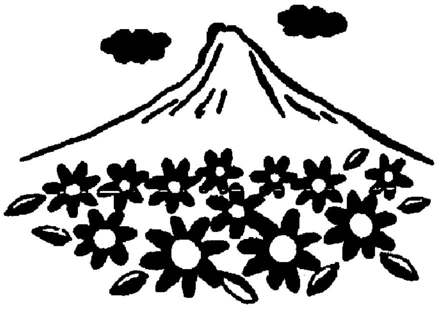
Figure 1C:
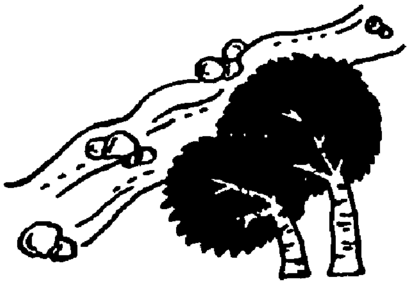
Figure 2A:
FIGS. 2A, 2B, 2C, 2D, and 2E are views showing halftone processing by a method based on the postscript halftone dot generation method.
Figure 2B:
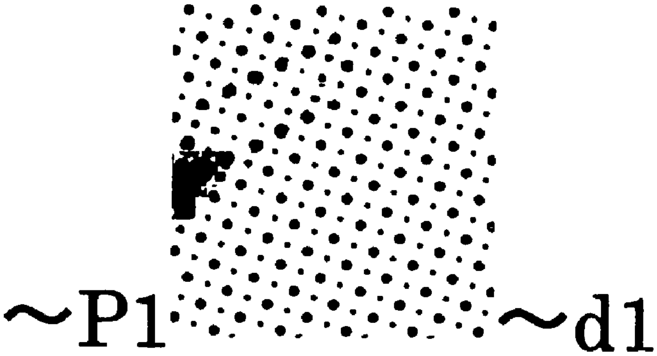
Figure 2C:
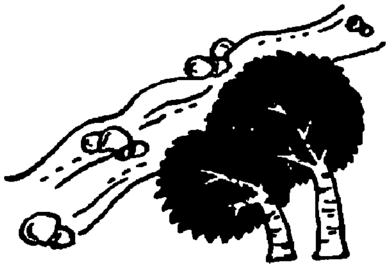
Figure 2D:
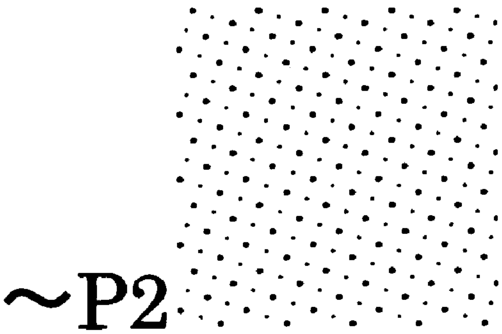
Figure 2E:
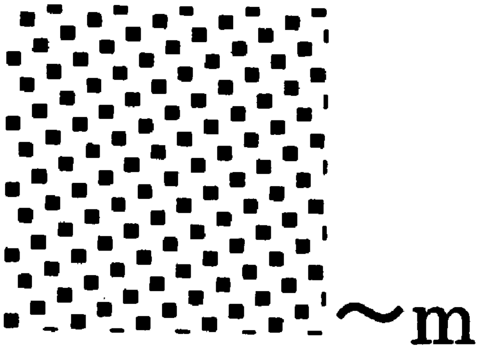

In the first halftone region having m×m pixels shown in FIG. 1A, a halftone dot image P1 (FIG. 1B) laid out by circular dots 1 is printed by three colors, i.e., cyan (C), magenta (M), and yellow (Y). In the second halftone region having n×n pixels, a halftone dot image P2 (FIG. 1C) laid out by circular dots 3 is printed by only black (Bk) ink containing an infrared absorptive dye. As halftone dots 2 around the halftone dot image P2, three color solid images of cyan (C), magenta (M), and yellow (Y) containing no infrared absorptive dye are laid out.

The shape of halftone dots in each halftone region is not limited to the circular shape. Instead, random dots or a special halftone dot shape with a degree of freedom, which is obtained by converting an input image with a design into continuous-tone halftone dots made of halftone dots (halftone screen) by using a special halftone dot generation method proposed in Japanese Patent Laid-Open No. 11-268228 filed by the present applicant, may be used.

FIG. 2 shows a partial enlarged view dl (FIG. 2B) of the halftone dot image P1 (FIG. 2A) generated by a technique for directly defining two kinds of halftone dot data in the postscript halftone dot generation method, a partial enlarged view d2 (FIG. 2D) of the halftone dot image P2 (FIG. 2C), and a partial enlarged view m (FIG. 2E) of an image mask generated by the image processing method of uniformly laying out two kinds of halftone dot images on the same plane, which is proposed in Japanese Patent Laid-Open No. 2001-205917 filed by the present applicant. FIGS. 2A to 2E explain halftone dot images of a cyan (C) plate in the halftone dot images which reproduce a full-color image containing cyan (C), magenta (M), yellow (Y), and black (Bk).

FIG. 3 explains that a visible halftone dot image d1' (FIG. 3A) is generated by image arithmetic processing of the partial enlarged view d1 of the halftone dot image P1 and the partial enlarged view m of the image mask, and an invisible halftone dot image d2' (FIG. 3B) is generated by image arithmetic processing of the partial enlarged view d2 of the halftone dot image P2 and the partial enlarged view m of the image mask. Image arithmetic processing of the invisible halftone dot image d2' and the partial enlarged view m of the image mask is also executed to generate a halftone dot image d3 to multiply the three color solid images of cyan (C), magenta (M), and yellow (Y) inks around the invisible halftone dot image d2'.

The inks that can be used in the present invention are not limited to cyan (C), magenta (M), and yellow (Y). A combination of three colors including two colors having a complementary color relationship and black (Bk) which has an isochromatic relationship to the two colors and contains an infrared absorptive dye can also be implemented. In this case, the first halftone region 1 having m×m pixels shown in FIG. 1 is laid out by double tones of two colors having a complementary color relationship and containing no infrared absorptive dye. In the second halftone region 3 having n×n pixels, printing is performed by using only black (Bk) ink which has an isochromatic relationship to the two colors having a complementary color relationship and contains an infrared absorptive dye. The halftone region 2 around the second halftone region is laid out by solid images of two colors having a complementary color relationship and containing no infrared absorptive dye, which are the same inks as in the first halftone region 1.

Figure 3A:
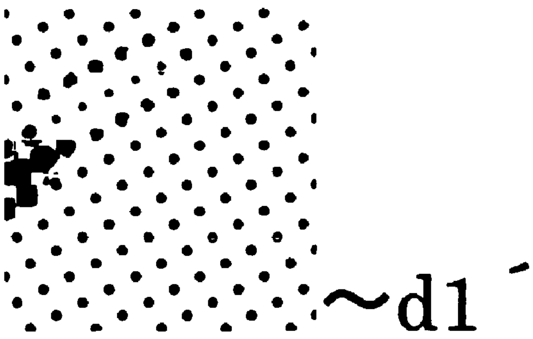
FIGS. 3A, 3B, 3C, and 3D are views for explaining halftone dot images for a cyan color plate of halftone dot images which reproduce a full-color image containing cyan (C), magenta (M), yellow (Y), and black (Bk) in the first embodiment.
Figure 3B:
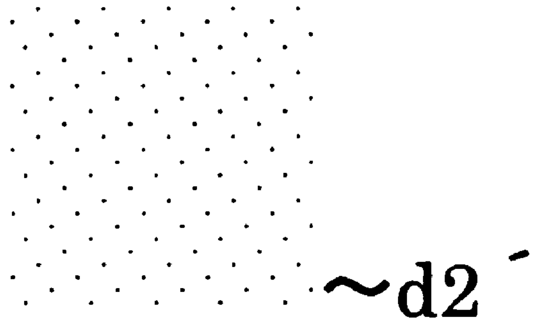
Figure 3C:
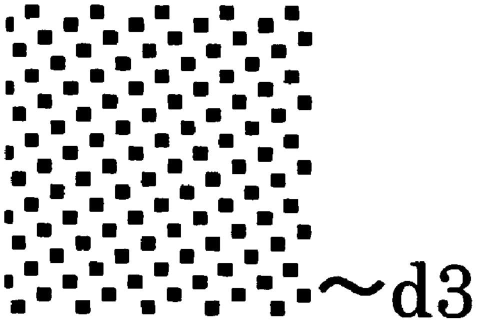
Figure 3D:
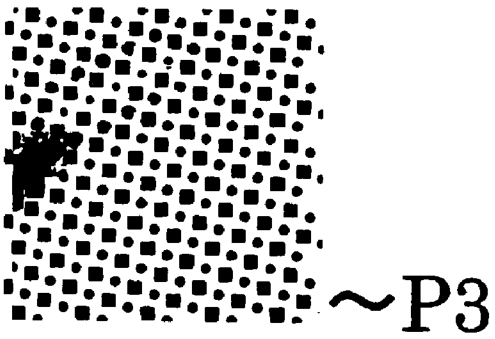

A printed product thus obtained by this embodiment has the structure of a partial enlarged view P3 shown in FIG. 3D. In a visible state, the landscape P1 of a mountain is recognized, though it is difficult to recognize that the landscape P2 of a river is hidden. When this printed product is observed as an infrared photo, the halftone image of the landscape P2 of the river can be recognized as a latent image.

Second Embodiment

Figure 4:
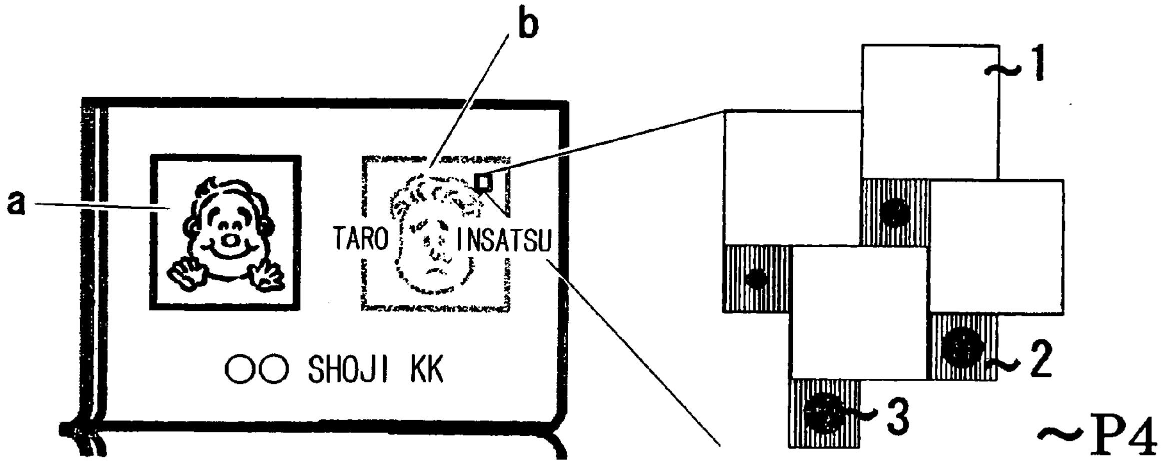
FIG. 4 is an explanatory view showing an identification card adapted in the second embodiment.

An identification card is produced as the second embodiment. In a portion a shown in FIG. 4, a general halftone dot image which does not use the halftone dot structure of the present invention is laid out by cyan (C), magenta (M), and yellow (Y). A portion b shown in FIG. 4 is halftone-processed by a method based on the postscript halftone dot generation method by using the halftone dot structure of the present invention. No visible image is laid out in a first halftone region 1 having m×m pixels. An invisible image is laid out in a second halftone region 3 having n×n pixels by using only black (Bk) ink containing an infrared absorptive dye. A portion 2 around the invisible image is constituted by three color solid images of cyan (C), magenta (M), and yellow (Y) containing no infrared absorptive dye so that the second halftone region having n×n pixels has a black-color-based isochromatic solid image layout.

Figure 5A:
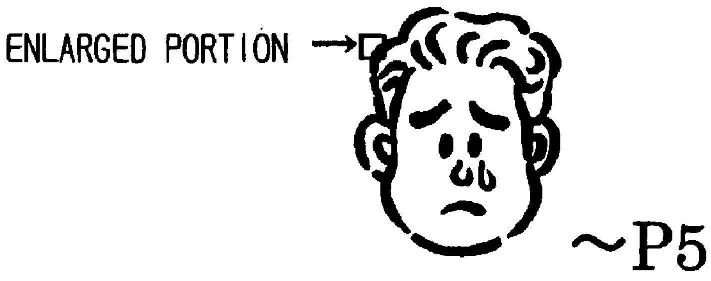
FIGS. 5A, 5B, and 5C are views for explaining the halftone dot layout state of each color plate in the second halftone region having n×n pixels.
Figure 5B:
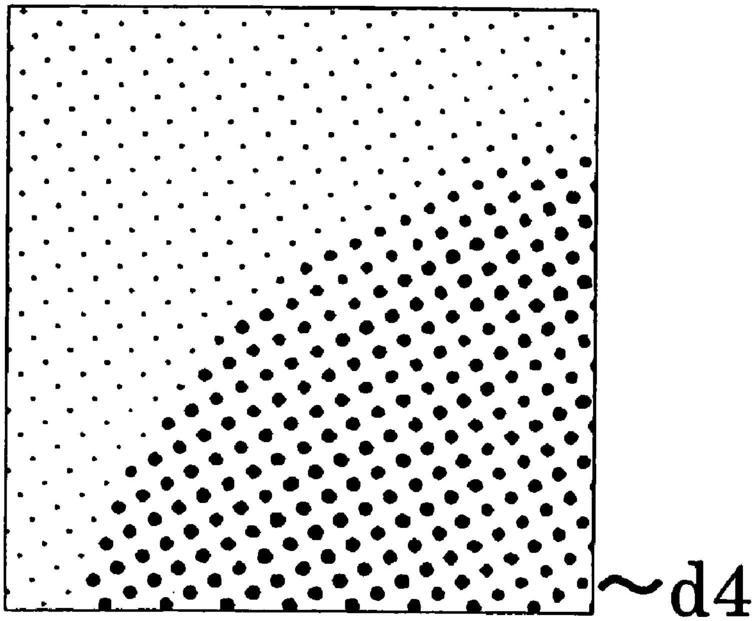
Figure 5C:
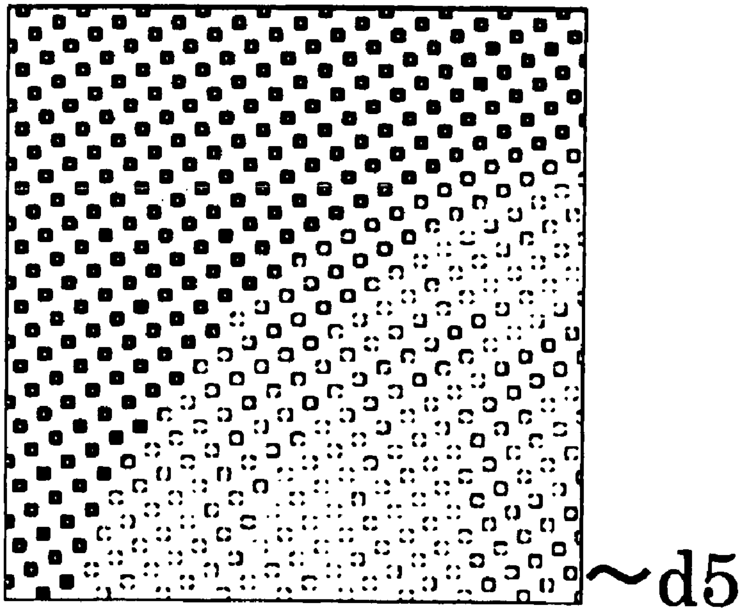

FIG. 5 explains the halftone dot layout state of each color plate in the second halftone regions 2 and 3 having n×n pixels on the portion b shown in FIG. 4. When these halftone dots are superposed, a black-based uniform tint state is obtained. Hence, an invisible image P5 (FIG. 5A) cannot visually be recognized.

When an infrared reflection/transmission characteristic between a portion d4 (FIG. 5B) printed by black (Bk) ink generally used and a portion d5 (FIG. 5C) printed by cyan (C), magenta (M), and yellow (Y) inks is used, and an invisible image is printed by the black (Bk) ink, the invisible image P5 on the portion b in FIG. 4 cannot be recognized unless a special authentication apparatus such as an infrared camera is used.

Third Embodiment

As the third embodiment, an example in which production of an identification card is applied to on-demand printing by the method of the first embodiment will be described.

A technique called "on-demand printing" can be interpreted in various ways. It sometimes indicates short-run color printing, a service for continuously executing processes up to bookbinding and providing books just in time, or a service for outputting books one by one. Of such applications of a multifunctional printer, page variable printing takes the best advantage of uniqueness of the on-demand printing. This means to print different contents (information), i.e., "variable data" and quickly and properly provides character or image information specialized to an individual or company through a "paper medium".

Figure 6:
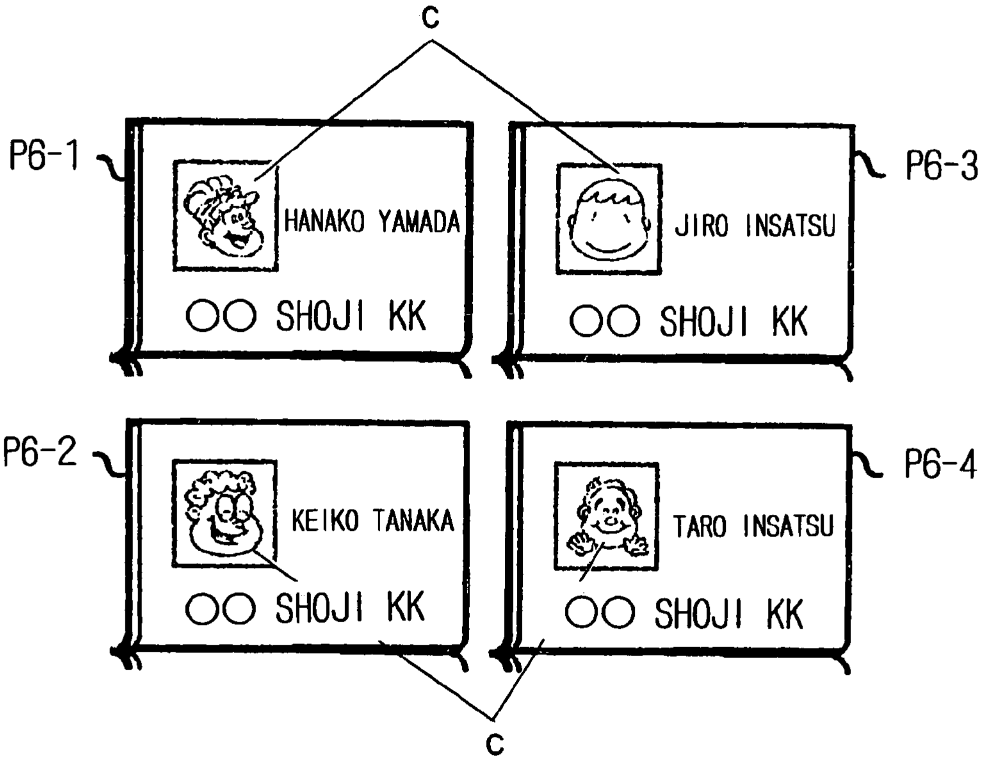
FIG. 6 is a view showing the state of a visible image when an identification card adapted to on-demand printing by the method of the first embodiment, as the third embodiment.

Invisible images according to this embodiment are uniformly laid out on the same planes as those of face images c of individuals in FIG. 6. A variable printed product with four plates P6-1 to P6-4 is obtained by an on-demand printer. Personal names are also simultaneously variable-printed. In this embodiment, the personal names are added as visible information.

Figure 7:
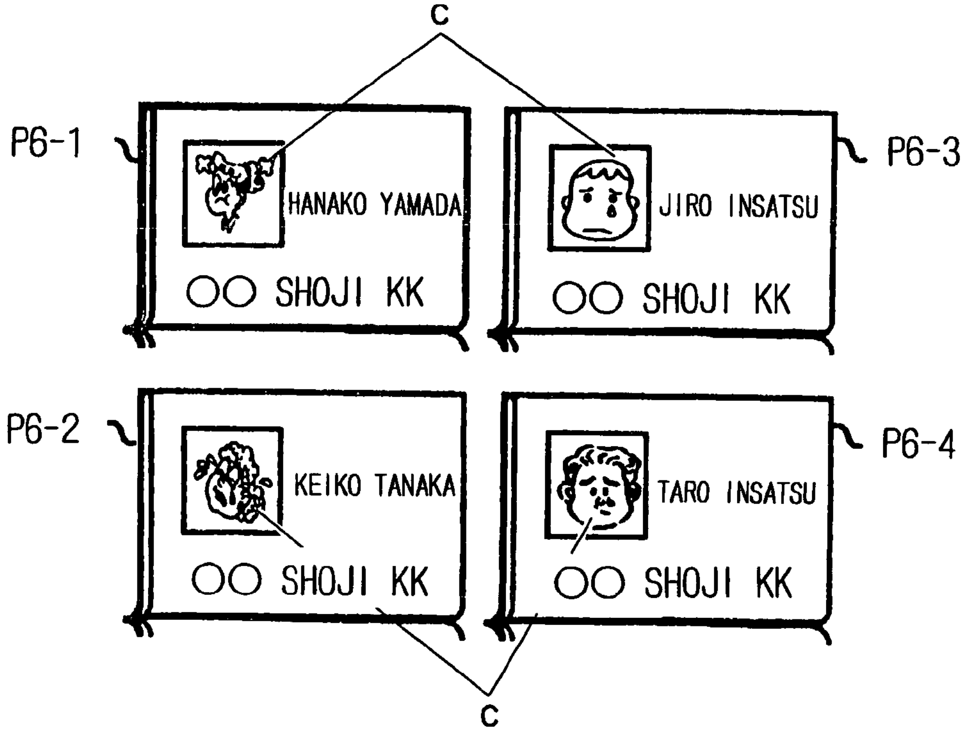
FIG. 7 is a view showing a state wherein the state of an invisible image can be recognized by using an infrared camera when an identification card adapted to on-demand printing by the method of the first embodiment, as the third embodiment.

When the printed product shown in FIG. 6 is observed by an infrared camera, the invisible images P6-1 to P6-4 which cannot visually be recognized are variable-printed by the four plates, as indicated by c in FIG. 7.

Fourth Embodiment

As the fourth embodiment, production of an identification card is applied to on-demand printing by the method of the second embodiment.

Figure 8:
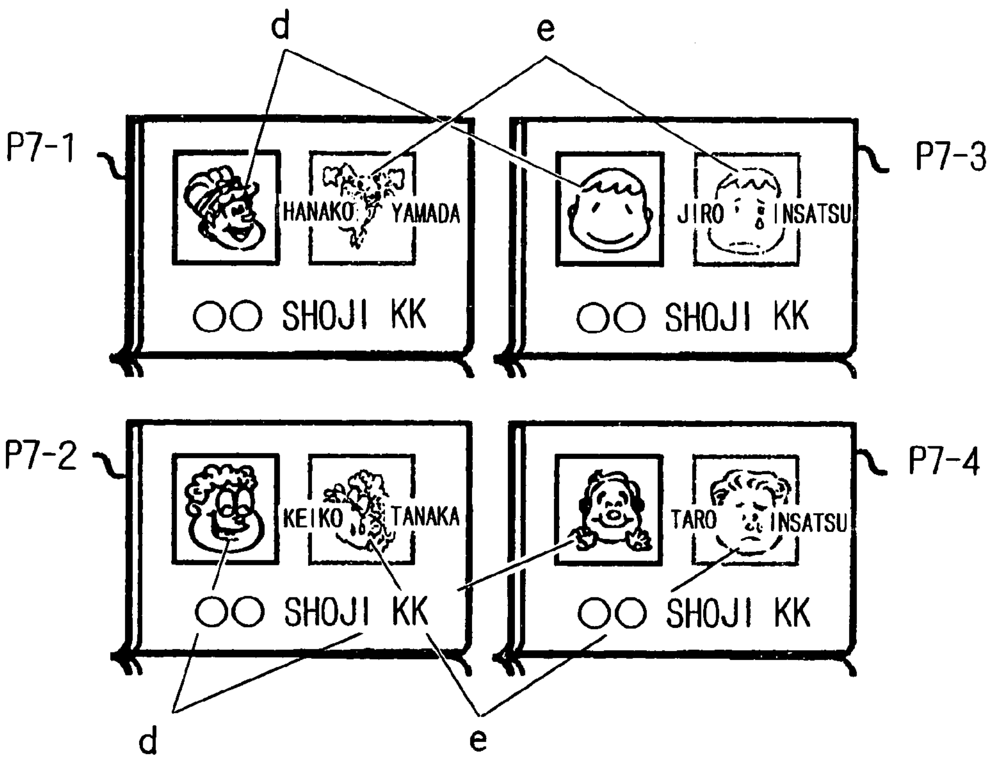
FIG. 8 is a view showing the state of a visible image when an identification card adapted to on-demand printing by the method of the second embodiment, as the fourth embodiment.

In each portion d shown in FIG. 8, a general halftone dot image which does not use the halftone dot structure of the present invention is halftone-arranged by cyan (C), magenta (M), yellow (Y), and black (Bk) inks. Each portion e shown in FIG. 8 is halftone-processed by a method based on the postscript halftone dot generation method by using the halftone dot structure of the present invention. The portion e has a black-based uniform tint state. Hence, the invisible image cannot visually be recognized. Invisible images P7-1 to P7-4 are variable-printed in four plates by an on-demand printer. Personal names are also simultaneously variable-printed. In this embodiment, the personal names are added as visible information.

Figure 9:
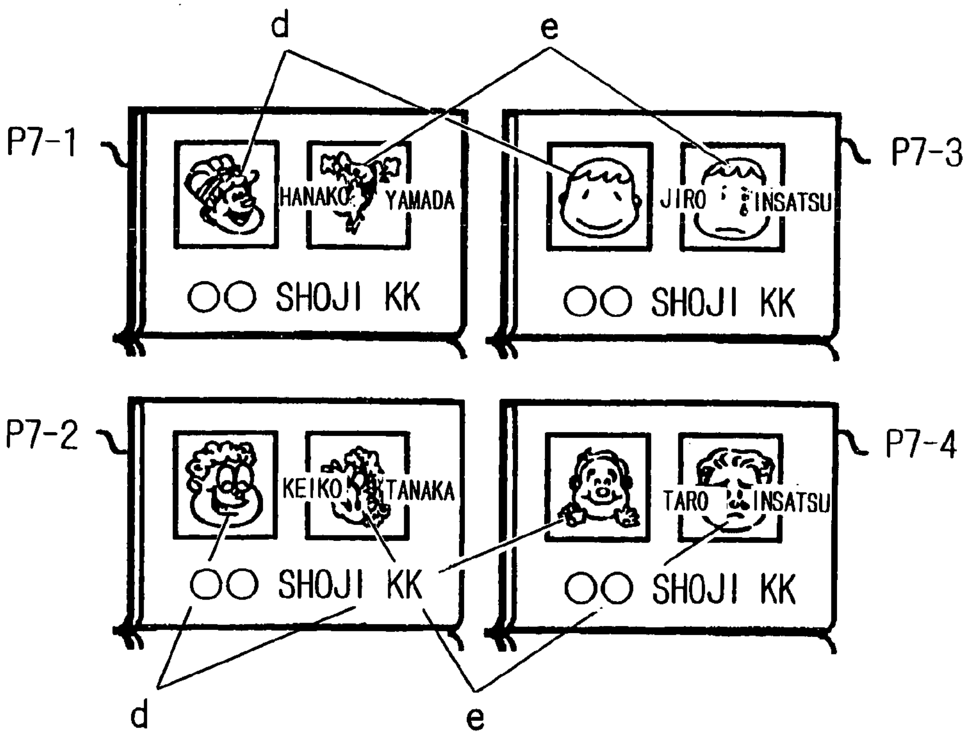
FIG. 9 is a view showing a state wherein the state of an invisible image can be recognized by using an infrared camera when an identification card adapted to on-demand printing by the method of the second embodiment, as the fourth embodiment.

When the printed product shown in FIG. 8 is observed by an infrared monitor, the invisible images P7-1 to P7-4 shown in FIG. 9, which cannot visually be recognized, are variable-printed by the four plates. In the second to fourth embodiments, each personal name and company name are also displayed on the infrared monitor. The black (Bk) component of the face image in each portion d in FIG. 9 is also displayed. Whether these portions are to be made visible or invisible can freely be arranged as a design, and the present invention is not limited to the second to fourth embodiments.

According to the present invention, a continuous-tone image is printed by using halftone dots that can hardly be copied by a general plate making device and can be read by a machine, thereby preventing any forgery or alteration of a printed product. According to the present invention, one continuous-tone image can be printed in a predetermined region. In addition, two continuous-tone images which do not overlap each other are equally laid out in a predetermined region without fusing the halftone dots. With this arrangement, security printing by four color printing using cyan (C), magenta (M), yellow (Y), and black (Bk), which is widely used in a general market, can be implemented at a low cost. When an on-demand printer is used, individual information such as a character, symbol, pattern, or gray-scale image can be printed as an invisible image on each page of printed products which require an anti-forgery and anti-alteration functions, including valuable printed product.

The invention claimed is:

1. A halftone dot printed product comprising:

a plurality of sets of a first region and a second region adjacent to the first region are laid out, wherein the second region has a 2ath region formed by using ink of a predetermined color containing an infrared absorptive dye and a 2bth region formed by using ink which is based on a color similar to the predetermined color and contains no infrared absorptive dye, and wherein in accordance with a ratio of the 2ath region to the 2bth region in each second region, a halftone image is formed by the 2ath regions in the plurality of second regions.

2. The halftone dot printed product according to claim 1, wherein the ink used in the 2ath region is black ink, and the ink used in the 2bth region is a black-color-based ink containing three primary color inks of cyan, magenta, and yellow.

3. The halftone dot printed product according to claim 1, wherein the first region has an area larger than that of the second region.

4. The halftone dot printed product according to claim 1, wherein the second region, the 2ath region is surrounded by the 2bth region.

5. The halftone dot printed product according to claim 1, wherein ink containing no infrared absorptive dye is used in the first region.

6. The halftone dot printed product according to claim 5, wherein halftone dots are laid out in each first region by using ink containing no infrared absorptive dye, and a halftone image is formed by a plurality of first regions.

7. The halftone dot printed product according to claim 1, wherein each second region is surrounded by the plurality of first regions.

8. The halftone dot printed product according to claim 1, further comprising an image region formed by using ink containing no infrared absorptive dye.

9. The halftone dot printed product according to claim 8, wherein the image region formed by using the ink containing no infrared absorptive dye and the first region and second region are printed while being at least partially superposed.

10. A halftone dot printed product printing method laying out a plurality of sets of a first region and a second region adjacent to the first region, wherein the second region has a 2ath region and is formed by using ink of a predetermined color containing an infrared absorptive dye and a 2bth region formed by using ink which is based on a color similar to the predetermined color and contains no infrared absorptive dye, and wherein in accordance with a ratio of the 2ath region to the 2bth region in each second region, a halftone image is formed by the 2ath regions in the plurality of second regions.

11. The halftone dot printed product printing method according to claim 10, wherein black ink is used in the 2ath region, and a black-color-based ink containing three primary color inks of cyan, magenta, and yellow is used in the 2bth region.

12. The halftone dot printed product printing method according to claim 10, wherein an area of the first region is set larger than that of the second region.

13. The halftone dot printed product printing method according to claim 10, wherein in the second region, the 2ath region is surrounded by the 2bth region.

14. The halftone dot printed product printing method according to claim 10, wherein ink containing no infrared absorptive dye is used in the first region.

15. The halftone dot printed product printing method according to claim 14, wherein halftone dots are laid out in each first region by using ink containing no infrared absorptive dye, and a halftone image is formed by a plurality of first regions.

16. The halftone dot printed product printing method according to claim 10, wherein each second region is surrounded by the plurality of first regions.

17. The halftone dot printed product printing method according to claim 10, further comprising an image region formed by using ink containing no infrared absorptive dye.

18. The halftone dot printed product printing method according to claim 17, wherein the image region formed by using the ink containing no infrared absorptive dye and the first region and second region are printed while being at least partially superposed.

* * * * *

UNITED STATES PATENT AND TRADEMARK OFFICE

CERTIFICATE OF CORRECTION

PATENT NO. : 7,298,528 B2

APPLICATION NO. : 10/494203
DATED : November 20, 2007

INVENTOR(S) : Nagashima

It is certified that error appears in the above-identified patent and that said Letters Patent is hereby corrected as shown below:

<u>Column 1,</u> after Line 41, insert the following:

--SUMMARY OF THE INVENTION

It is therefore an object of the present invention to provide a method for generating visible and invisible images by using four basic color inks of cyan (C), magenta (M), yellow (Y), and black (Bk) used in general commercial printing, and printing, at a low cost, an invisible image which cannot be copied by a current photoengraving apparatus and cannot be recognized unless a special authentication apparatus is used.

Of four basic color inks of cyan (C), magenta (M), yellow (Y), and black (Bk) used in general commercial printing, the black (Bk) ink is a black pigment mainly containing carbon black and exhibits absorbance throughout the range from ultraviolet to infrared. In the general market, there are also security printing materials with unique characteristics, like chromofine black ink available from Dainichiseika Color & Chemicals, which absorbs no infrared rays. However, when a fact that an image obtained by superposing cyan (C), magenta (M), and yellow (Y) of the four basic colors absorbs no infrared rays is used, only an image printed by black (Bk) ink containing carbon black can visually be recognized by using a special authentication apparatus such as an infrared camera.--

Signed and Sealed this

Sixth Day of May, 2008

JON W. DUDAS
*Director of the United States Patent and Trademark Office*